US008989956B2

(12) United States Patent
Dunst et al.

(10) Patent No.: US 8,989,956 B2
(45) Date of Patent: Mar. 24, 2015

(54) SYSTEM, METHOD AND APPARATUS FOR REAL-TIME MEASUREMENT OF VEHICLE PERFORMANCE

(76) Inventors: Bradley James Dunst, Oviedo, FL (US); Mark Oostdyk, Cape Canaveral, FL (US)

( * ) Notice: Subject to any disclaimer, the term of this patent is extended or adjusted under 35 U.S.C. 154(b) by 498 days.

(21) Appl. No.: 13/235,728

(22) Filed: Sep. 19, 2011

(65) Prior Publication Data

US 2013/0073140 A1 Mar. 21, 2013

(51) Int. Cl.
*G06F 7/00* (2006.01)
*G06F 19/00* (2011.01)

(52) U.S. Cl.
USPC .............. 701/32.7; 701/22; 701/99; 701/31.4

(58) Field of Classification Search
USPC ........ 701/32.7, 33.1, 33.4, 34.3, 34.2, 22, 99; 415/30.13; 307/10.1
See application file for complete search history.

(56) References Cited

U.S. PATENT DOCUMENTS 4,156,184 A * 5/1979 Benbow .................... 324/103 R
4,763,531 A 8/1988 Dietrich et al.
4,969,099 A * 11/1990 Iwatsuki et al. ................ 701/62
5,016,478 A 5/1991 Mercat
5,027,303 A 6/1991 Witte
6,443,019 B1 9/2002 Porth et al.
6,694,828 B1 2/2004 Nicot
7,293,476 B2 11/2007 Gierut
7,313,467 B2 * 12/2007 Breed et al. ....................... 701/1
7,389,682 B2 6/2008 JaVaherian
7,555,370 B2 * 6/2009 Breed et al. ....................... 701/2
8,160,781 B2 * 4/2012 Naono et al. .................... 701/48
8,798,832 B2 * 8/2014 Kawahara et al. .............. 701/22
2007/0114074 A1 * 5/2007 Jansson et al. ............... 180/6.48
2009/0314104 A1 * 12/2009 Lohr et al. ............... 73/862.338
2013/0073140 A1 * 3/2013 Dunst et al. .................. 701/32.7
2013/0133463 A1 * 5/2013 Moriyama ...................... 74/493

OTHER PUBLICATIONS

Design of an axial flux permanent magnet machine for automotive energy efficiency competition; Faria, O.A. et al.,Electrical Machines and Systems (ICEMS), 2011 International Conference on;Digital Object Identifier: 10.1109/ICEMS.2011.6073847 Publication Year: 2011 , pp. 1-5;IEEE Conference Publications.*

Electromechanical steering, suspension, drive and brake modules; Zetterstrom, S.; Vehicular Technology Conference, 2002. Proceedings. VTC 2002-Fall. 2002 IEEE 56$^{th}$; vol. 3; Digital Object Identifier: 10.1109/VETECF.2002.1040538 Publication Year: 2002 , pp. 1856-1863 vol. 3.*

(Continued)

*Primary Examiner* — Cuong H Nguyen
(74) *Attorney, Agent, or Firm* — Maier & Maier, PLLC

(57) ABSTRACT

A system for real-time measurement of vehicle performance. The system can include at least one sensor module mounted on a rotating member of the vehicle and a central module disposed in the vehicle. The sensor module can include a plurality of sensors communicatively coupled to a microcontroller, at least one wireless communications device communicatively coupled to the microcontroller, and a power source. The central module can include a central processor, memory, a central wireless communications device communicatively coupled to the central processor and to the at least one wireless communications device of the sensor module. The rotating member of the vehicle can be a wheel, a brake rotor, or a torsion disc disposed between an axle of the vehicle and a wheel of the vehicle.

15 Claims, 5 Drawing Sheets

(56) References Cited

OTHER PUBLICATIONS

Design and evaluation of an active electromechanical wheel suspension system; Mats Jonassona, et al., Department of Chassis and Vehicle Dynamics, Volvo Car Corporation, SE-405 31 Göteborg, Sweden, Mechatronic, vol. 18, Issue 4, May 2008, pp. 218-230.*

Regenerative brake energy analysis for the VTREX plug-in hybrid electric vehicle; Gantt, L.R. ; Perkins, D.E. ; Alley, R.J. ; Nelson, D.J.; Vehicle Power and Propulsion Conference (VPPC), 2011 IEEE; DOI: 10.1109/VPPC.2011.6043049; Publication Year: 2011 , pp. 1-6.*

Comparison of braking performance by electro-hydraulic ABS and motor torque control for in-wheel electric vehicle; Ko, Sungyeon ; Song, Chulho ; Park, Jeongman ; Ko, Jiweon ; Yang, Inbeom ; Kim, Hyunsoo; Electric Vehicle Symposium and Exhibition (EVS27), 2013 World; DOI: 10.1109/EVS.2013.6914910; Publication Year: 2013 , pp. 1-6.*

Aggregated Impact of Plug-in Hybrid Electric Vehicles on Electricity Demand Profile; Darabi, Z. ; Ferdowsi, M.; Sustainable Energy, IEEE Transactions on; vol. 2 , Issue: 4; DOI: 10.1109/TSTE.2011.2158123; Pub. Year: 2011 , pp. 501-508.*

Fault-Tolerant In-Wheel Motor Topologies for High-Performance Electric Vehicles; Ifedi, C.J. ; Mecrow, B.C. ; Brockway, S.T.M. ; Boast, G.S. ; Atkinson, G.J. ; Kostic-Perovic, D; Industry Applications, IEEE Transactions on; vol. 49 , Issue: 3 DOI: 10.1109/TIA.2013.2252131; Publication Year: 2013 , pp. 1249-1257.*

Neural fuzzy control of driving wheels for electric vehicle; Houacine, K. ; Mellah, R. ; Guermah, S. ; Charif, M.; Systems and Control (ICSC), 2013 3rd International Conf. on; DOI: 10.1109/ICoSC.2013.6750830; Pub. Yr: 2013 , pp. 25-30.*

Yaw stability improvement for four-wheel active steering vehicle using sliding mode control; Hamzah, N. ; Sam, Y.M. ; Selamat, H. ; Aripin, M.K. ; Ismail, M.F; Signal Processing and its Applications (CSPA), 2012 IEEE 8th International Colloquium on DOI: 10.1109/CSPA.2012.6194704; Publication Year: 2012 , pp. 127-132.*

Control over negative effects of vertical vibration on independent steering/driving wheels of an electric vehicle; Zhijun Deng ; Zhurong Dong ; Hao Qiu; Automatic Control and Artificial Intelligence (ACAI 2012), International Conference on DOI: 10.1049/cp.2012.1078; Publication Year: 2012 , pp. 717-721.*

* cited by examiner

SYSTEM, METHOD AND APPARATUS FOR REAL-TIME MEASUREMENT OF VEHICLE PERFORMANCE

BACKGROUND

Automotive enthusiasts frequently install modifications on their vehicles that enhance the performance of the vehicle's drivetrain. Such performance modifications can include intake manifolds allowing for less restricted airflow, modified exhaust headers, less restricted post-catalytic-converter exhaust systems, modified camshafts, ram-air intakes, cylinder head modifications, and so forth, as well as modifications to other systems of the vehicle. To conclusively determine the effects of a particular modification, it is necessary to measure the performance characteristics of the vehicle. In other instances, an owner may also wish to measure the performance characteristics of an unmodified vehicle. Typically, such measurements are performed on a dynamometer. Due to the significant cost and space requirements of dynamometers, an owner would need to take the vehicle to an automotive garage or shop.

Dynamometers typically fall into two categories: engine dynamometers and chassis dynamometers. An engine dynamometer requires that the motor be removed from the vehicle and attached to the apparatus. The engine is then accelerated with an opposing load provided by a controllable electrical or mechanical system, or a combination of the two. The acceleration is then correlated with the load and the motor torque can then be determined. If the engine shaft speed is known, the power rating of the motor can be calculated. The chassis dynamometer does not require that the engine be removed. In this case, the vehicle is placed on the dynamometer such that the drive wheels engage a roller, and an opposing load is then accelerated by the drive wheels. Based on the acceleration, load, and drive speed, the torque and power can be determined.

Both of the previously described methods present limitations, do not reflect real-world driving conditions, and are typically expensive. Removing the engine from the vehicle to use an engine dynamometer is labor-intensive, while the power losses due to the other drivetrain components are not known. A chassis dynamometer requires a qualified individual to secure the vehicle for safety, and does not account for losses due to the road surface nor the effects of actual driving conditions (such as, for example the effects of ram-air intakes). Both of the traditional methods are usually expensive and do not reflect real world driving. Furthermore, vehicle analysis systems used by original equipment manufacturers (OEMs) can be prohibitively expensive for individual or occasional use. A simple and inexpensive way of measuring vehicle performance characteristics in real-time while taking into account real-world driving conditions is therefore desired.

SUMMARY

According to at least one exemplary embodiment, system for real-time measurement of vehicle performance is disclosed. The system can include at least one sensor module mounted on a rotating member of the vehicle and a central module disposed in the vehicle. The sensor module can include a plurality of sensors communicatively coupled to a microcontroller, at least one wireless communications device communicatively coupled to the microcontroller, and a power source. The central module can include a central processor, memory, a central wireless communications device communicatively coupled to the central processor and to the at least one wireless communications device of the sensor module. The rotating member of the vehicle can be a wheel, a brake rotor, or a torsion disc disposed between an axle of the vehicle and a wheel of the vehicle.

According to another exemplary embodiment, a method for real-time measurement of vehicle performance is disclosed. The method can include providing a sensor module on a rotating member of the vehicle, providing a central module in the vehicle, receiving first measurement data from a plurality of sensors of the sensor module, receiving second measurement data from a data bus of the vehicle, and processing the first measurement data and the second measurement data to obtain calculated data for real-time horsepower and torque values at the rotating member.

According to another exemplary embodiment, a rotating member for a vehicle is disclosed. The rotating member of a vehicle can include a plurality of sensors disposed on the surface of the rotating member at locations that experience increased deflection relative to other locations on the surface of the rotating member, a microcontroller communicatively coupled to the plurality of sensors, at least one wireless communications device communicatively coupled to the microcontroller, and a power source. The rotating member may be a wheel, a brake rotor, or a torsion disc disposed between an axle of the vehicle and a wheel of the vehicle.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1A:
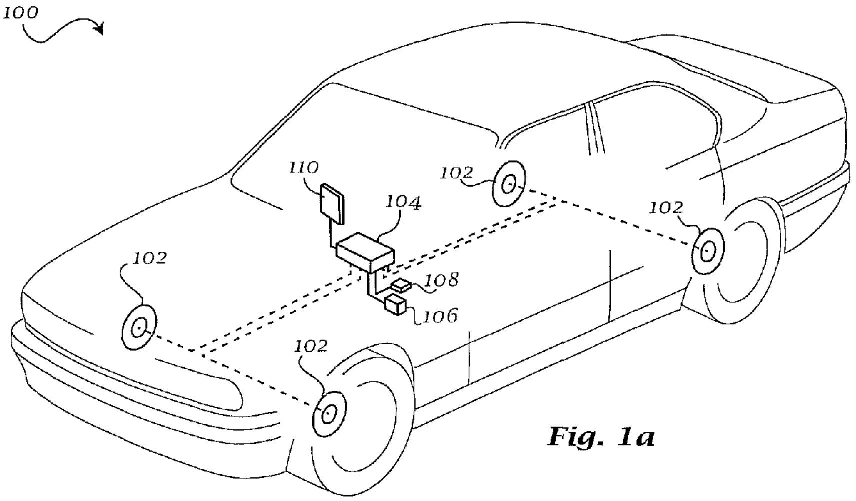
FIG. 1*a* shows an exemplary embodiment of a system for real-time measurement of vehicle performance installed in a vehicle.
Figure 1B:
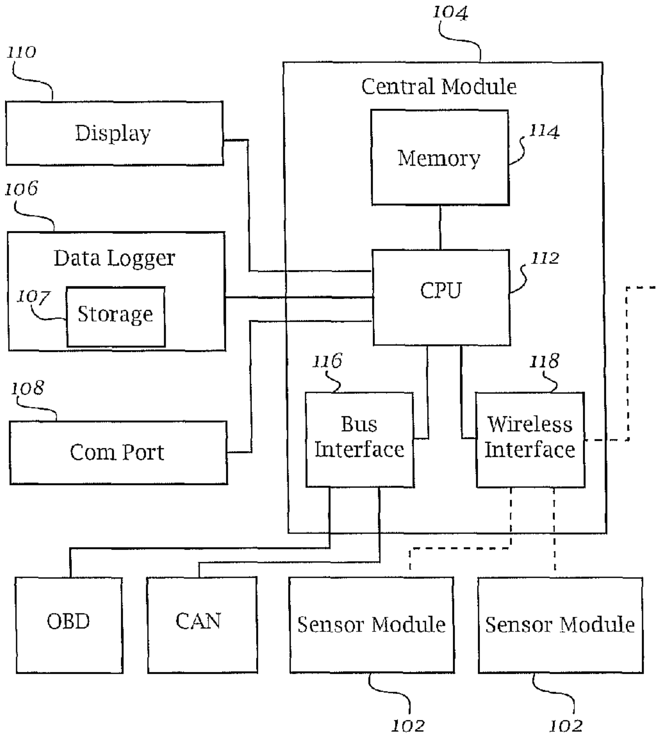
FIG. 1*b* is a diagram of an exemplary embodiment of a central module for a system for real-time measurement of vehicle performance.
Figure 1C:
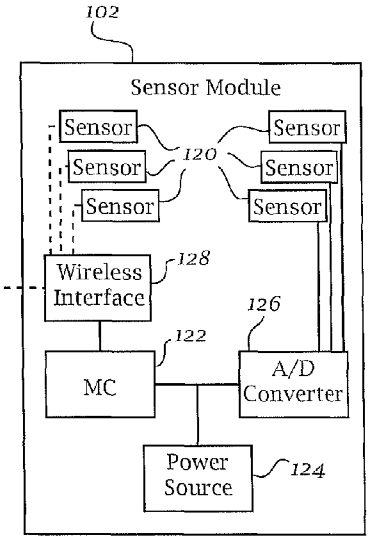
FIG. 1*c* is a diagram of an exemplary embodiment of a sensor module for a system for real-time measurement of vehicle performance.

Referring to FIGS. 1*a*-1*c*, in one exemplary embodiment, a system for real-time measurement of vehicle performance 100 is disclosed. System 100 may include a plurality of sensor modules 102 communicatively coupled to a central module 104. System 100 may further include a data logger 106, communications port 108, and display 110. Sensor modules 102 may be disposed on one or more rotating members of the vehicle, as described further below. Central module 104 may be mounted in any desired location of the vehicle, for example in the trunk, in the interior, under a seat, or behind the dashboard. As central module 104 may be adapted to communicatively couple with one or more of vehicle's data buses, the module may be mounted in a location that allows for easy coupling to the desired data buses. Some exemplary embodiments of central module 104 may provide for user interaction and can thus be mounted in a user-accessible location, for example on the dashboard or central console of the vehicle. Power to central module 104 may be provided by the electrical system of the vehicle.

Central module 104 may include a central processor 112, memory 114, and at least one communication coupling 116. Memory 114 may be any known volatile or non-volatile information storage medium that enables system 100 to function as described herein, for example SRAM, DRAM, flash memory, and the like. Communication couplings 116 may include couplings for the vehicle's data buses. Central module 104 may be adapted to communicate utilizing standardized data bus protocols, for example OBD-II, CAN, VAN, MOST, LIN, D2B, KWP2000, FlexRay, or any other known standardized bus protocol. System 100 may further be adapted to communicate utilizing automobile manufacturers' proprietary data bus protocols. As an illustrative example, in a BMW vehicle, such bus protocols may be the I-Bus, K-Bus and D-Bus. Any analogous automobile manufacturers' proprietary data buses that enable system 100 to function as described herein may also be utilized. A communications coupling 116 may be provided for each desired data bus with which central module 104 may communicate. On older vehicles without data buses, the communications couplings may be adapted to tap into existing vehicle sensor outputs, with analog-to-digital converters provided as needed. Furthermore, desired sensors may be installed on such older vehicles, or any vehicles lacking desired sensors.

In addition to data received from sensor modules 102, central module 104 may utilize data received from the vehicle data buses to which the central module is coupled. As an illustrative example, such data can include powertrain-related data such as engine speed, coolant temperature, oil pressure, mass airflow sensor readings, manifold pressure readings, spark timing, fuel supply data, knock sensor readings, oxygen sensor readings, or any other desired data. Furthermore, such data can include data from other vehicle systems, such as vehicle speed, brake application forces, anti-lock brake system data, stability and traction control data, steering angle, suspension-related information, or any other desired data. In some embodiments, central module 104 may further send data over the vehicle data buses. For example, in some embodiments, audio or video data may be communicated over the vehicle's data buses so as to be output via the vehicle's audio system or via the vehicle's built-in display.

System 100 may further include a data logger 106, which may be included within central module 104 or may be provided separately and communicatively coupled to central module 104. The data logger can include a storage device 107, such as, for example, flash memory, a magnetic disc, an optical disc, or any other known non-volatile information storage medium that enables system 100 to function as described herein. Data logger 106 can store any or all data received by central module 104 as well as the results of any or all calculations performed by central module 104.

System 100 can further include a communications port 108 communicatively coupled to central module 104, for coupling system 100 to a computing device. Communications port 108 may be compliant with any known computing communications standard, for example USB, FireWire, Thunderbolt, and so forth, with wireless communication standards such as Bluetooth, IEEE 802.11, and so forth, or a proprietary wired or wireless communications hardware and protocols. When central module 104 is coupled to a computing device, any or all data received by central module 104 as well as the results of any or all calculations performed by central module 104 may be monitored in real-time via software provided on the computing device. Data stored by data logger 106 can also be accessed through software provided on the computing device, or may be downloaded onto the computing device, for example as a text file, a comma-separated value (.csv) file, or in a proprietary format.

System 100 may further include a display 110 communicatively coupled to central module 104. Display 110 may be an LCD display, an OLED display, or any other display known in the art that enables system 100 to function as described herein. Display 110 may further be touch-sensitive. Physical controls may also be provided for controlling the functionality of system 100. Any or all data received by central module 104 as well as the results of any or all calculations performed by central module 104 may be monitored in real-time via display 110. Data stored by data logger 106 may be shown on display 110 as well. A user interface may be provided for display 110, which may include diverse data display modes, user-configurable settings for system 100, and any other features that may be contemplated or provided as desired. In an alternate embodiment, display 110 may be provided as a heads-up display that is projected onto the windshield of the vehicle such that it is visible to the driver.

Communicative coupling between central module 104 and the various components of system 100, including sensor modules 102, may be facilitated by a central wireless communications device 118 communicatively coupled to central module 104. The central wireless communication device may utilize any known communications protocol, for example the IEEE 802.11 wireless communications protocol. The central wireless communication device may be adapted to communicatively couple to each sensor module 102 of the plurality of sensor modules that may be installed on the vehicle so as to receive data from the sensor modules. In some embodiments, communications with a computing device may be facilitated by central wireless communications device 118 in lieu of communications port 108.

The above-described components of system 100 may be provided separately, or one or more of the components may be provided as a multi-component unit in a single enclosure. For example, in one embodiment, central module 104 may be placed in a location such as the vehicle's trunk or behind the dashboard, while data logger 106, display 110, and communications port 108 may be placed in a user-accessible location, for example attached to the dashboard or center console of the vehicle. Communications between the components may be wired or wireless, with each separately-provided component or multi-component unit including a wireless communication device communicatively coupled thereto. In another embodiment, central module 104, data logger 106, display 110 and communications port 108 may be provided as a single unit which may be placed in a user-accessible location.

Turning to FIG. 1*c*, each sensor module 102 may include a plurality of sensors 120, a power source 124, at least one wireless communications device 128, and a microcontroller 122 communicatively and electrically coupled to sensors 120 and the at least one wireless communications device 128. Sensor module 120 may further include an analog-to-digital signal converter 126, which may include signal conditioners and amplifiers. At least one wireless communication device 128 included in sensor module 102 may be adapted to communicate with the central wireless communication device 118 of central module 104. At least one wireless communication device 128 may further be adapted to communicate with the plurality of sensors 120 included in sensor module 102. Power source 124, wireless communications device 128, and microcontroller 122 may be provided as a multi-component unit in a single enclosure, while sensors 120 may be disposed in certain locations on a rotating member of the vehicle, as described further below.

Sensors 120 may be strain gauges disposed on the surface of the rotating member of the vehicle. Additional sensors or gauges included in sensor module 102 may be, for example, pressure sensors, torque sensors, rotational velocity sensors, temperature sensors, or any other desired measuring devices. Sensors 120 can be communicatively coupled to microcontroller 122. Communicative couplings between sensors 120 and microcontroller 122 may be wired, wireless or a combination thereof, depending on the sensor type. In the case of wired communicative couplings, power may also be provided to sensors 120 from power source 124 via the wire connection. In the case of wireless communicative couplings, sensors 120 may be based on surface acoustic wave (SAW) technology. In such a case, a wireless communication device 128 of sensor module 102 can emit signals at desired frequencies so as to excite the SAW-based sensors and can receive the resultant reply signals from the SAW-based sensors.

In one exemplary embodiment, signals received from sensors 120 by microcontroller 122 may be relayed as raw sensor data to central module 104 via a wireless communicative coupling between the central module and the sensor module 102. The raw sensor data may then be processed by central processor 112. In another exemplary embodiment, analog signals received from sensors 120 may first be processed by analog-to-digital signal converter 126 and then by microcontroller 122, and the resultant data may be subsequently sent to central module 104 via the wireless communicative coupling between the modules.

Power source 124 may include a battery, for example a user-replaceable battery or a rechargeable battery. Power source 124 may further include a charging device, for example a kinetic charging device. As the sensor modules are provided as rotating members of the vehicle, the kinetic charging device can generate electric power from the rotation of the sensor module, for example by inductive coupling or by piezoelectric means, thereby charging the battery or powering the components of the sensor module. The kinetic charging device may have any desired arrangement, for example, a magnet and a coil both contained within the kinetic charging device, or a coil located within the charging device and a magnet located on a stationary member of the vehicle such that the coil passes proximate to the magnet during rotation of the rotating member of the vehicle. Power source 124 may further include shielding and noise cancellation devices so as to minimize electromagnetic interference between power source 124 and sensors 120.

Figure 2A:
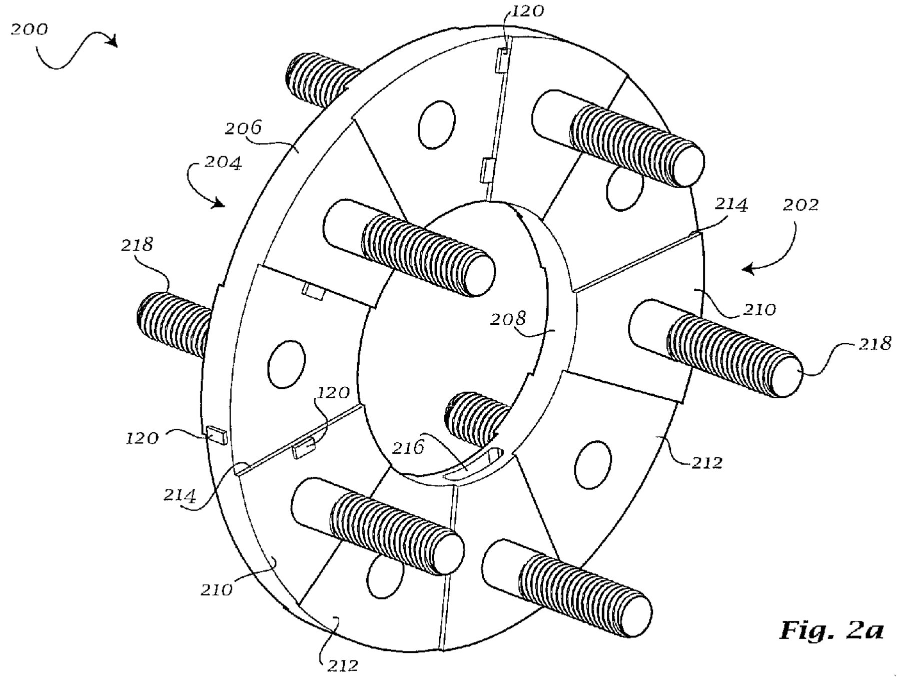
FIGS. 2*a*-2*b* show an exemplary embodiment of a rotating member for a system for real-time measurement of vehicle performance.
Figure 2B:
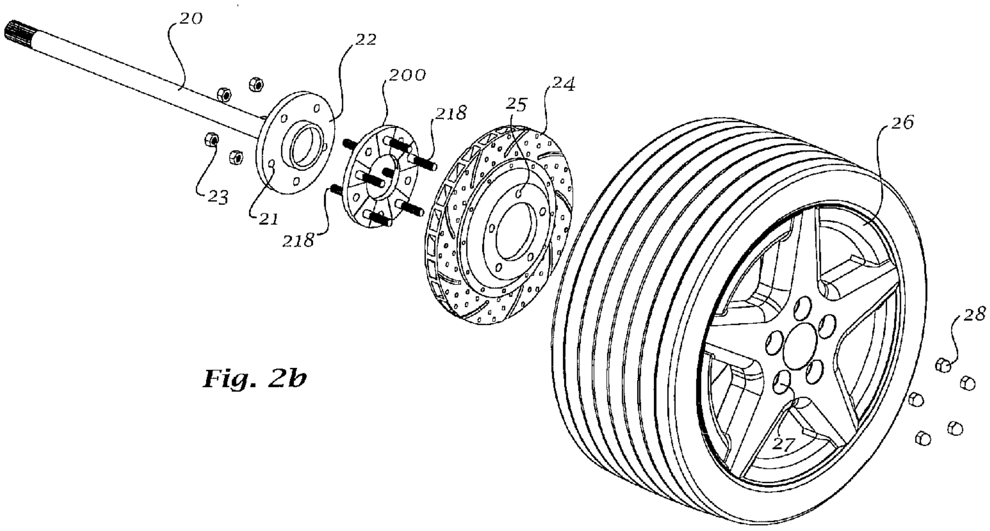

Turning to FIGS. 2*a*-2*b*, in one exemplary embodiment, the rotating member may be a torsion disc 200 adapted to be disposed between the axle 20 of a vehicle and the brake assembly 24 of the vehicle.

Torsion disc 200 can have a first face 202, a second face 204, an outer circumferential face 206 and an inner circumferential face 208. First and second faces 202, 204 can be divided into a plurality of raised sectors 210, projecting axially from face 202 or 204, extending from the inner circumferential face 206 to outer circumferential face 208, and separated by recessed sectors 212. Raised sectors 210 can include radial edges 214 which can extend from the surfaces of raised sectors 210 to the surfaces of recessed sectors 212 and which can be substantially orthogonal thereto. Recessed sectors 212 can be sized equal to each other and can be sized greater than raised sectors 210, which can likewise be sized equal to each other. The sectors can be disposed on faces 202, 204 such that the central radius of a raised sector 210 of first face 202 is aligned with the central radius of a recessed sector 212 of second face 204, and vice versa.

Disposed substantially along the central radius of each raised sector 210 and projecting axially therefrom may be a stud 218 for coupling torsion disc 200 to an axle 20 of a vehicle as well as to a brake assembly 24 and a wheel 26 of the vehicle. Studs 218 of second face 204 may be inserted through corresponding receiving apertures 21 on a flange 22 of axle 20, and axle coupling nuts 23 may be affixed thereto. Studs 218 of first face 202 can be inserted through corresponding receiving apertures 25 on brake assembly 24, and through lug nut holes 27 of wheel 26. Wheel coupling nuts 29, for example lug nuts, may then be affixed to the studs, completing the assembly. In some embodiments, studs may also be attached to axle flange 22 or wheel 26 and protrude into the torsion disc 206.

Such a configuration of torsion disc 200 facilitates the isolation of the load transfer plane between the mounting surfaces of first face 202 and second face 204 by separating the mounting surfaces into different planes. The separation of the mounting surfaces facilitates reducing or eliminating the preload forces between first face 202 and second face 204, and reduces the likelihood of the transfer of shear forces between the studs mounted on first face 202 and the studs mounted on second face 204. This can facilitate increased accuracy in the measurement of the strain forces by reducing or eliminating the unknown amount of load transfer that would exist in the event the mounting surfaces were not separated, wherein the preload force would be acting on the load transfer plane, resulting in load transfer via friction of the non-separated mounting surfaces.

Defined in the inner circumferential face 208 of torsion disc 200 may be a recess 216 that can be sized and configured to receive the components of the sensor module; however, recess 216 may be defined in any location on the torsion disc that does not detract from the functionality of system 100 as described herein. Such components may be power source 124, microcontroller 122, converter 126, and wireless communication device 128. Torsion disc 200 can further include balancing structures to offset the difference in weight and weight distribution resulting from recess 216 and the components therein. Such balancing structures may be a second recess disposed axially opposite recess 216 and including a counterweight substantially equal to the weight of the components in recess 216, or any other known balancing structure that enables system 200 to function as described herein.

The plurality of sensors 120 may be disposed on first and second faces 202, 204 as well as outer circumferential face 206 of torsion disc 200, or any other desired surface. The sensor modules may be placed at locations that experience greater deflection relative to the rest of torsion disc 200, so as to increase the sensitivity of the strain measurements or any other measurements by the sensor module. Such locations may be determined for each torsion disc 200 prior to installation of the sensors. Exemplary locations may include, but are not limited to, on raised radial portions 210 proximate edge 214, on recessed sectors 212 abutting edge 214, on outer circumferential face 206, and on the isolated torsional plane of torsion disc 200.

The configuration of torsion disc 200 may be adapted for the bolt pattern of the particular vehicle on which system 100 is being installed. For example, in the illustrated embodiment of FIGS. 2*a*-2*b*, torsion disc 200 can be adapted for a five-lug bolt pattern, and can include five recessed sectors and five raised sectors on each of faces 210, 212. Each recessed sector 212 can be a sector of approximately 40°, while each raised sector 210 can be a sector of approximately 32°. It should be appreciated that the number and angles of the raised and recessed sectors, as well as the positions of studs 218 along the central radii of the raised sectors can vary depending on the bolt pattern of the particular vehicle on which system 100 is being installed. Studs 218 may also be attached to the flange of axle 22 or to wheel 26 and protrude into torsion disc 200. It should also be appreciated that any known coupling between torsion disc 200, brake assembly 24 and wheel 26 may be contemplated and provided as desired.

Figure 3A:
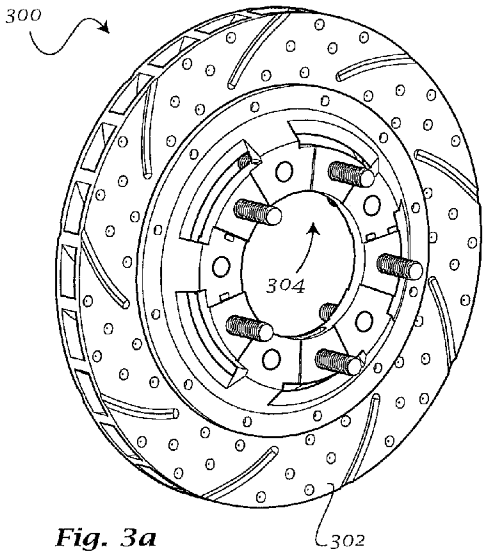
FIGS. 3*a*-3*c* show another exemplary embodiment of a rotating member for a system for real-time measurement of vehicle performance.
Figure 3B:
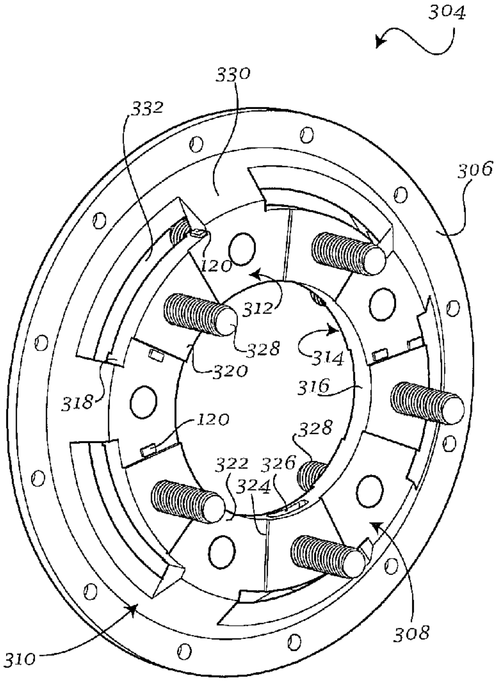
Figure 3C:
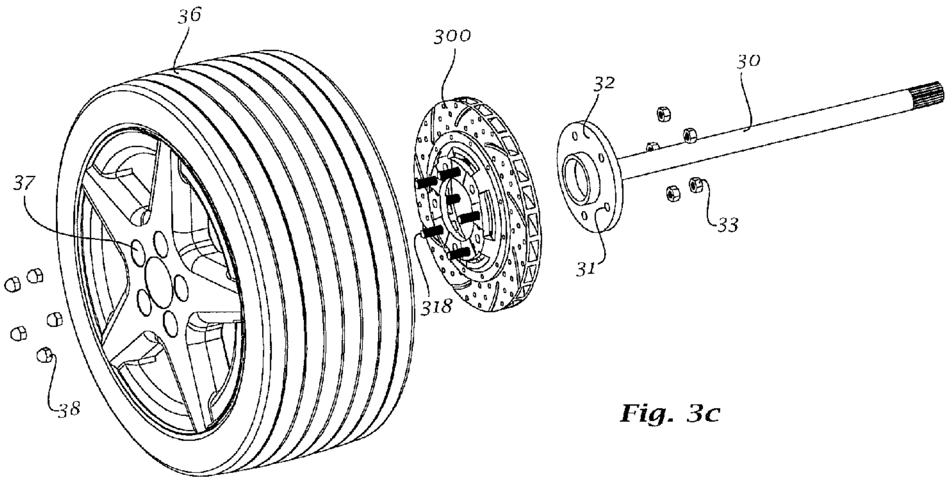

Turning to FIGS. 3*a*-3*c*, in another exemplary embodiment, the rotating member may be a disc brake rotor 300 having a rotor portion 302 and a torsion disc 308. Torsion disc 308 may be coupled to rotor portion 302 via any desired structure; for example, the torsion disc 308 may be provided as part of an inner flange 304.

Rotor portion 302 may be any known disc brake rotor, may be made of any appropriate material, may be slotted, cross-drilled, ventilated, and may include any other desired features. Coupled substantially proximate the inner circumference of the rotor portion 302 can be inner flange 304, which may have a substantially frusto-conical shape. Flange portion 304 can include an outer ring 306, a torsion disc 308 concentric with and axially offset from outer ring 306, and a bridging portion 310 connecting outer ring 306 to torsion disc 308.

Torsion disc 308 can have a first face 312, a second face 314, an outer circumferential face 316 and an inner circumferential face 318. First and second faces 312, 314 can be divided into a plurality of raised sectors 320, projecting axially from face 312 or 314, extending from the inner circumferential face 316 to outer circumferential face 318, and separated by recessed sectors 322. Raised sectors 320 can include radial edges 324 which can extend from the surfaces of raised sectors 320 to the surfaces of recessed sectors 322 and which can be substantially orthogonal thereto. Recessed sectors 322 can be sized equal to each other and can be sized greater than raised sectors 320, which can likewise be sized equal to each other. The sectors can be disposed on faces 312, 314 such that the central radius of a raised sector 320 of first face 312 is aligned with the central radius of a recessed sector 322 of second face 314, and vice versa.

Disposed substantially along the central radius of each raised sector 320 and projecting axially therefrom may be a stud 328 for coupling disc brake rotor 300 to an axle 30 of a vehicle and to a wheel 36 of the vehicle. Studs 318 of second face 314 may be inserted through corresponding receiving apertures 31 on a flange 32 of axle 30, and axle coupling nuts 33 may be affixed thereto. Studs 328 of first face 312 can be inserted through lug nut holes 37 of wheel 36. Wheel coupling nuts 38, for example lug nuts, may then be affixed to the studs, completing the assembly. In some embodiments, studs may also be attached to axle flange 32 or wheel 36 and protrude into the torsion disc 308.

Such a configuration of torsion disc 308 facilitates the isolation of the load transfer plane between the mounting surfaces of first face 312 and second face 314 by separating the mounting surfaces into different planes. The separation of the mounting surfaces facilitates reducing or eliminating the preload forces between first face 312 and second face 314, and reduces the likelihood of the transfer of shear forces between the studs mounted on first face 312 and the studs mounted on second face 314. This can facilitate increased accuracy in the measurement of the strain forces by reducing or eliminating the unknown amount of load transfer that would exist in the event the mounting surfaces were not separated, wherein the preload force would be acting on the load transfer plane, resulting in load transfer via friction of the non-separated mounting surfaces.

Defined in the inner circumferential face 316 of torsion disc 308 may be a recess 326 that can be sized and configured to receive the components of the sensor module; however, recess 326 may be defined in any location on the torsion disc that does not detract from the functionality of system 100 as described herein. Such components may be power source 124, microcontroller 122, converter 126, and wireless communication device 128. Torsion disc 308 can further include balancing structures to offset the difference in weight and weight distribution resulting from recess 326 and the components therein. Such balancing structures may be a second recess disposed axially opposite recess 326 and including a counterweight substantially equal to the weight of the components in recess 326, or any other known balancing structure that enables system 100 to function as described herein.

The plurality of sensors 120 may be disposed on first and second faces 312, 314 as well as outer circumferential face 316 of torsion disc 308. Sensors 120 may be placed at locations that experience greater deflection relative to the rest of torsion disc 308, so as to increase the sensitivity of the strain measurements or any other measurements by the sensor module. Such locations may be determined for each torsion disc

308 prior to installation of the sensor. Exemplary locations may include, but are not limited to, on raised sectors 320 proximate edge 324, on recessed sectors 322 abutting edge 324, and on outer circumferential face 316 abutting connecting supports 330, and on the isolated torsional plane of torsion disc 308.

Torsion disc 308 may be coupled to rotor portion 302 via any desired structure. In one exemplary embodiment, the torsion disc may be coupled to the rotor portion as part of inner flange 304, which can include an outer ring 306 and a bridging portion 310. Outer ring 306 may be sized such that the inner circumference of outer ring 306 is substantially similar to the inner circumference of rotor portion 302. Outer ring 306 can further be sized such that an overlap exists between outer ring 306 and rotor portion 302, wherein the overlap is sufficient to securely couple flange portion 304 to rotor portion 302.

Bridging portion 310 can connect torsion disc 308 to outer ring 306 and can have a substantially frusto-conical shape. Proximate outer ring 306, bridging portion 310 can be substantially continuous, while proximate torsion disc 308, bridging portion 310 can include a plurality of connecting supports 330 separated by gaps 332. Each connecting support 330 can be disposed proximate a raised sector 320 of first face 312 such that the central radius of the raised sector and center line of the connecting support are substantially collinear.

The configuration of disc brake rotor 300 may be adapted for the bolt pattern of the particular vehicle on which system 100 is being installed. For example, in the illustrated embodiment of FIGS. 3*a*-3*c*, disc brake rotor 300 can be adapted for a five-lug bolt pattern, and can include five recessed sectors and five raised sectors on each of faces 312, 314 of torsion disc 308. Each recessed sector 322 can be a sector of approximately 40°, while each raised sector 320 can be a sector of approximately 32°. It should be appreciated that the number and angles of the raised and recessed sectors, as well as the positions of studs 328 along the central radii of the raised sectors can vary depending on the bolt pattern of the particular vehicle on which system 100 is being installed. Studs 328 may also be attached to the flange of axle 32 or to wheel 36 and protrude into torsion disc 308. It should also be appreciated that any known coupling between torsion disc 200, brake assembly 24 and wheel 26 may be contemplated and provided as desired.

Figure 4A:
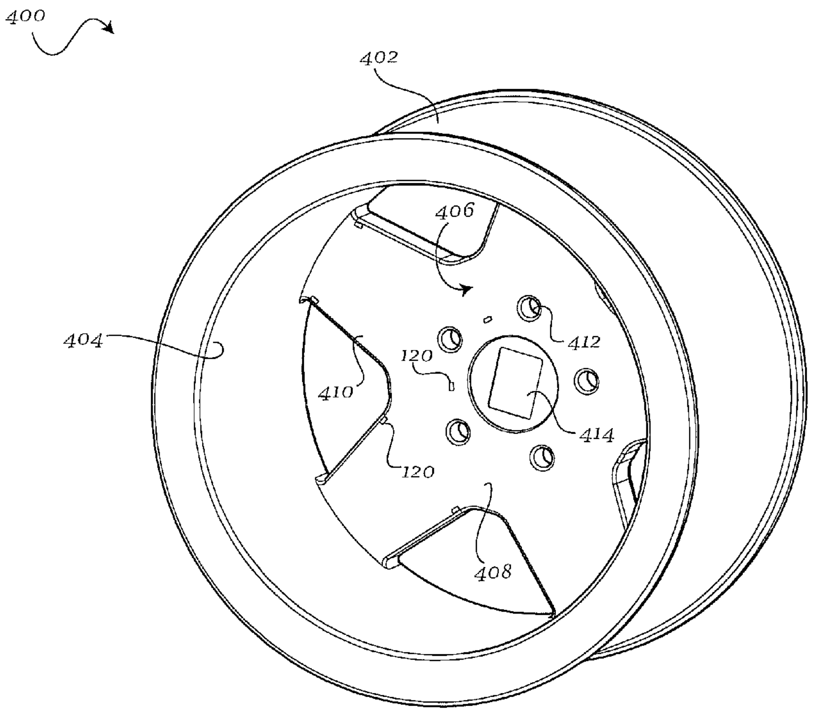
FIGS. 4*a*-4*b* show another exemplary embodiment of a rotating member for a system for real-time measurement of vehicle performance.
Figure 4B:
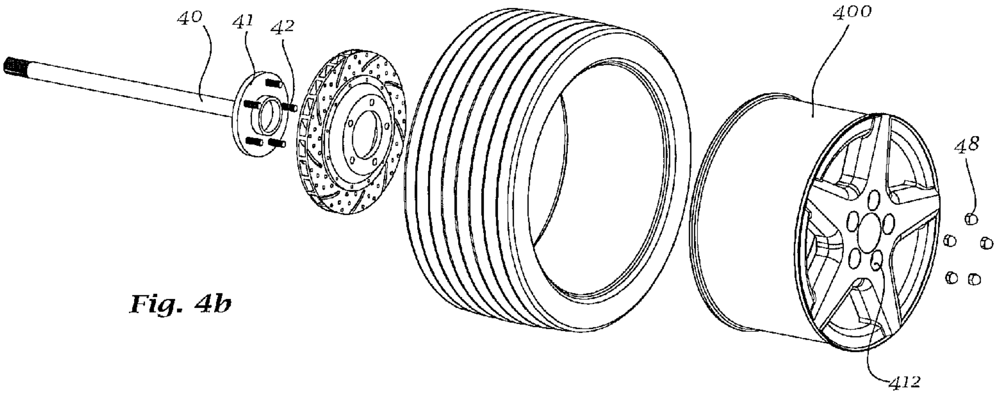

Turning to FIGS. 4*a*-4*b*, in another exemplary embodiment, the rotating member may be a wheel 400. Wheel 400 may be made of any appropriate material, and may have any desired physical or ornamental configuration. Wheel 400 can include a rim 402 having an inner surface 404, a disc 406 having an inner face 408, spokes 410 or analogous structural members, and bores 412 for receiving lug nuts or bolts. Defined in a portion of disc 406 may be a recess 414 that can be sized and configured to receive the components of the sensor module. Such components may be power source 124, microcontroller 122, converter 126, and wireless communication device 128. In the illustrated embodiment, recess 414 may be defined substantially at the center of the inner face 408 of disc 406. In other embodiments, recess 414 may be defined in a spoke 410 or analogous structural member of disc 406, with balancing structures provided as necessary. In yet other embodiments, the components of sensor module 120 may be affixed to the inner surface 404 of rim 402, with balancing structures provided as necessary.

The plurality of sensors 120 may be disposed on the inner face 408 of disc 406. Sensors 120 may be placed at locations that experience greater deflection relative to the rest of disc 406, so as to increase the sensitivity of the strain measurements or any other measurements by the sensor module. Such locations may be determined for each wheel 400 prior to installation of the sensor. Exemplary locations may include, but are not limited to, proximate the edges of spokes 410 or analogous structural members of disc 406, and between bores 412. In some embodiments, a torsion disc may be coupled to the inner surface 404 of rim 402, and the sensors may be disposed on the isolated torsional plane of the torsion disc, substantially as described above.

Wheel 400 may be coupled to a vehicle using known coupling methods, for example by receiving studs 42 of a flange 41 of an axle 40 through bores 412. Wheel coupling nuts 48, for example lug nuts, may then be affixed to the studs, completing the assembly. The configuration of bores 412 of wheel 400 may be adapted for the bolt pattern of the particular vehicle on which system 100 is being installed. For example, in the illustrated embodiment of FIGS. 4*a*-4*b*, wheel 400 can be adapted for a five-lug bolt pattern; however, bores 412 may be disposed so as to be adapted for any known bolt pattern. Wheel 400 may further be adapted for vehicles having hub-centered wheel couplings.

Figure 5:
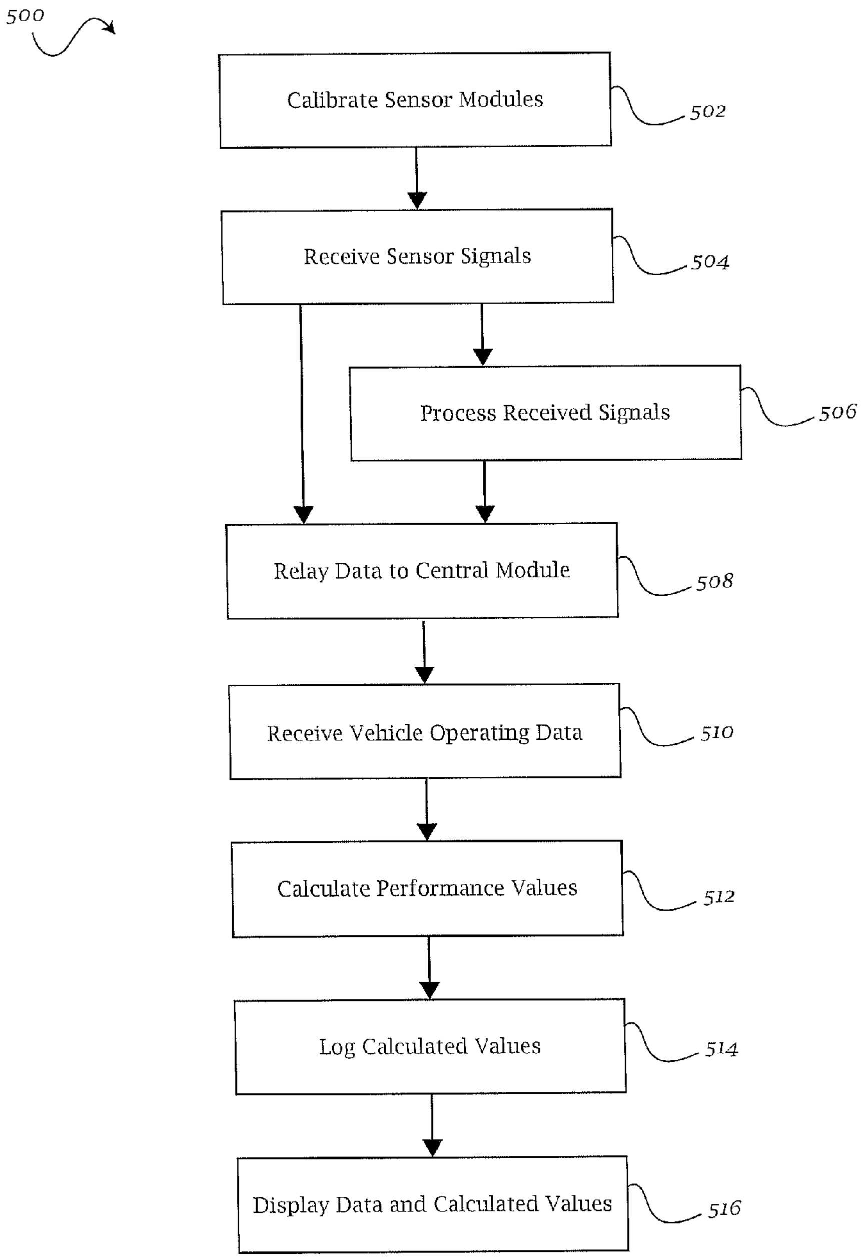
FIG. 5 shows an exemplary embodiment of a method for real-time measurement of vehicle performance.

Turning to FIG. 5, a process for real-time measurement of vehicle performance 500 may be disclosed. Subsequent to mounting a sensor module on the desired rotating member, the sensor module may be calibrated at step 502. Calibration of the sensor module can include applying at least one torsional load having a known value to the rotating members, measuring the response of the sensor modules, and correlating the value of the torsional load to the sensor response so as to generate an empirical or analytical calibration curve. If desired, calibration of the sensor module can further include applying at least one additional force having a known magnitude and direction to the rotating members, measuring the response of the sensor modules, and correlating the magnitude and direction of the at least one directional force to the sensor response so as to generate at least one additional empirical or analytical calibration curve. Subsequent to calibration, the rotating members may be installed on the vehicle, and the calibration curve may be input into the central processor 112.

In operation, when a load is applied to the rotating members on which sensor modules are mounted—for example due to acceleration or deceleration of the automobile, and/or due to lateral, vertical, forward, or rearward acting force—the sensors 120 that are strain gauges may be elastically deformed, thus allowing the strain on the strain gauges to be measured. Signals from sensors 120 may, at step 504 be communicated to microcontroller 122 of sensor module 120, whereupon, at step 506, the signals may be relayed as raw sensor data to central module 104, or processed by analog-to-digital signal converter 126 and microcontroller 122 at step 506, with the resultant data transmitted to central module 104 at step 508. The measured strain values may further be conditioned using a temperature compensation circuit and filtering, wherein the temperature may be received from a sensor 120 that is a temperature sensor.

Data received by central module 104 may be processed by central processor 112. The processing steps can include comparing the received data to the calibration curve input into processor 112, thereby generating torque and directional force values. Engine RPM values may then be received by central processor 112 at step 510, for example from a data bus of the vehicle, from a sensor that is a hall-effect sensor, or from any other device or method for determining engine revolution counts. At step 512, horsepower values may be calculated according to the formula HP=(torque·RPM)/5252, or any alternative analysis method. The calculated values, along with any other data received from other sensors or from the vehicle's data bus can then be logged and stored by data logger 106 at step 514 and displayed on display 110 at step 516.

Embodiments of system 100 can further include sensors to measure any existing Cartesian forces and moments on the rotating members on which the sensor modules are mounted. Sensors can therefore be included which can measure forces in the x, y and z planes, as well as moments in the x, y and z directions, or such measurements can be obtained from the vehicle's data bus, if available. These measurements can then be processed to generate data, including, but not limited to, data as to braking force, road-load power, traction-loss indication, vehicle weight, etc. Furthermore, the system can include sensors, adapters or capabilities for obtaining additional inputs, such as oxygen sensors, accelerometers, fuel consumption measurements, or any other desired characteristic. Such inputs can be used to determine, measure and report additional vehicle metrics such as fuel efficiency, stability, the effectiveness of the driver in controlling the vehicle, or any other desired metric.

Thus, the embodiments of system 100 described herein can provide the vehicle operator with real-time horsepower, torque, and other values during operation of the vehicle. Advantages of the embodiments of system 100 described herein can include, but are not limited to, measuring, displaying and logging power and torque output at the wheels of the vehicle, providing real-time data at any time while the vehicle is driven, and the ability to measure power, torque, and other performance variations stemming from vehicle modifications and driving conditions or techniques. Furthermore, as the sensor modules may be coupled to rotating members at each wheel of the vehicle, system 100 can gather separate data for each of the vehicle's wheels.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for real-time measurement of vehicle performance, comprising: at least one sensor module mounted on a rotating member of the vehicle wherein the rotating member is a torsion disc having a first face, a second face, an outer circumferential face and an inner circumferential face, wherein the first and second faces are divided into a plurality of raised sectors projecting axially from the first and second faces, extending from the inner circumferential face to the outer circumferential face and separated by a plurality of recessed sectors, the sensor module comprising at least one sensor communicatively coupled to a microcontroller, at least one wireless communications device communicatively coupled to the microcontroller, and a power source; and a central module disposed in the vehicle, the central module comprising a central processor, memory, a central wireless communications device communicatively coupled to the central processor and to the at least one wireless communications device of the sensor module, wherein the at least one sensor is mounted on one of the plurality of raised sectors or plurality of recessed sectors.

2. A method for real-time measurement of vehicle performance, comprising: receiving first measurement data from a plurality of sensors of a sensor module coupled to a rotating member of a vehicle wherein the rotating member is a torsion disc having a first face, a second face, an outer circumferential face and an inner circumferential face, wherein the first and second faces are divided into a plurality of raised sectors projecting axially from the first and second faces, extending from the inner circumferential face to the outer circumferential face and separated by a plurality of recessed sectors, the sensor module comprising a plurality of sensors mounted on the plurality of raised sectors and plurality of on recessed sectors and communicatively coupled to a microcontroller, at least one wireless communications device communicatively coupled to the microcontroller, and a power source; relaying the first measurement data to a central module disposed in the vehicle, the central module comprising a central processor, memory, a central wireless communications device communicatively coupled to the central processor and to the at least one wireless communications device of the sensor module; receiving second measurement data from a data bus of the vehicle; and processing one or more of the first measurement data and the second measurement data to obtain calculated data for real-time horsepower and torque values at the rotating member.

3. The system of claim 1, wherein the torsion disc is disposed between an axle of the vehicle and a wheel of the vehicle.

4. The system of claim 1, wherein the torsion disc is coupled to a brake rotor of the vehicle.

5. The system of claim 1, wherein the torsion disc is coupled to a wheel of the vehicle.

6. The method of claim 2, wherein the torsion disc is coupled to a wheel of the vehicle.

7. The system of claim 1, wherein the at least one sensor is one of a strain gauge, a pressure sensor, a torque sensor, a rotational velocity sensor, and a temperature sensor.

8. The system of claim 1, the central module further comprising a communicative coupling for at least one of the vehicle's data buses.

9. The system of claim 1, further comprising one or more of a data logger communicatively coupled to the central module and a display communicatively coupled to the central module.

10. The system of claim 1, wherein the power source of the sensor module comprises one or more of a battery and a kinetic charger.

11. The method of claim 2, wherein the torsion disc is coupled to a brake rotor of the vehicle.

12. The method of claim 2, wherein the first measurement data includes one or more of strain experienced by the rotating member, force exerted on the rotating member, or pressure exerted on the rotating member.

13. The method of claim 2, further comprising: logging the calculated data.

14. The method of claim 2, further comprising: displaying the calculated data.

15. The method of claim 2, wherein the torsion disc is disposed between an axle of the vehicle and a wheel of the vehicle.

* * * * *